A. H. AND N. E. RICHARDS.
PISTON.
APPLICATION FILED JULY 17, 1920.
1,406,684.
Patented Feb. 14, 1922.
2 SHEETS—SHEET 1.
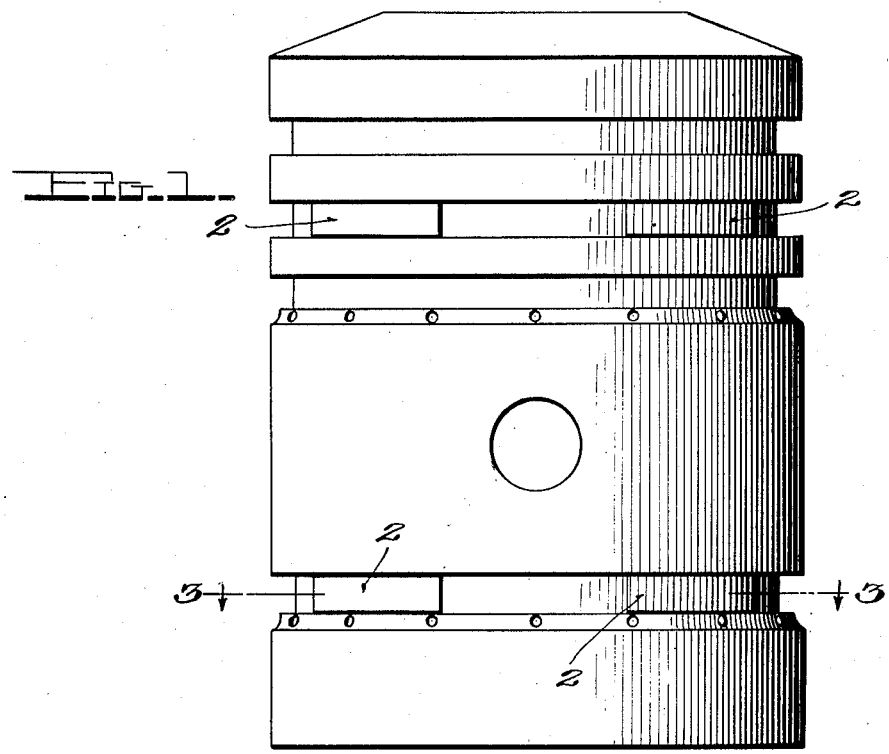
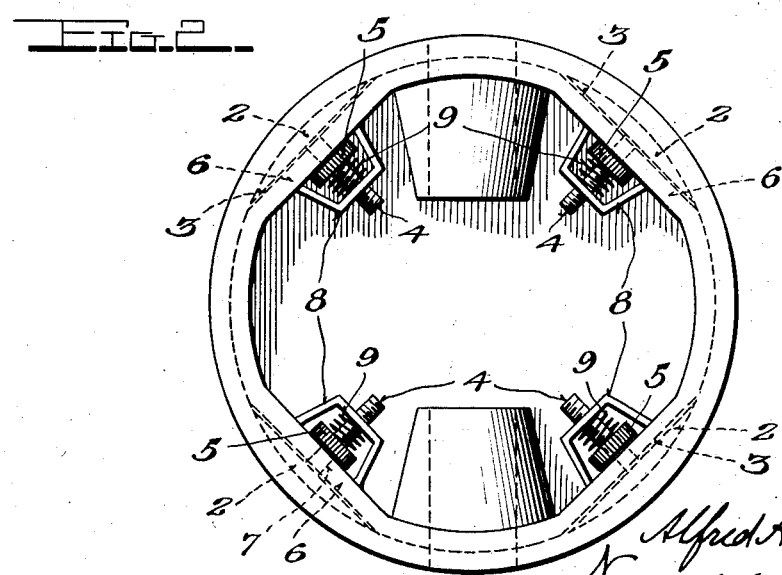
Inventor
Alfred H. Richards
Norman E. Richards
By Joseph A. Miller
Attorney A. H. AND N. E. RICHARDS.
PISTON.
APPLICATION FILED JULY 17, 1920.
1,406,684. Patented Feb. 14, 1922.
2 SHEETS—SHEET 2.
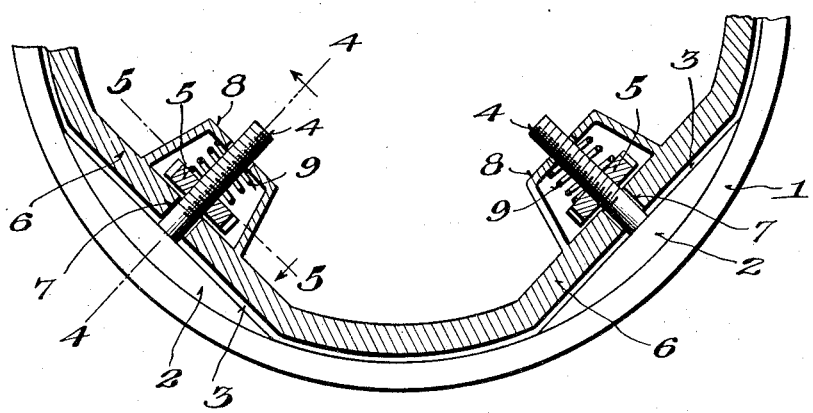
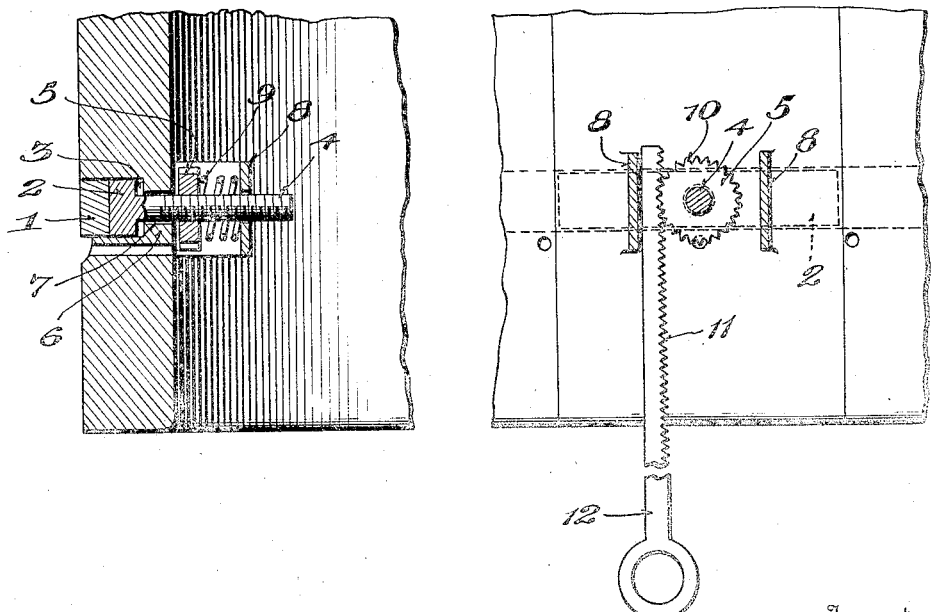

UNITED STATES PATENT OFFICE.

ALFRED H. RICHARDS AND NORMAN E. RICHARDS, OF MANVILLE, RHODE ISLAND.

PISTON.

1,406,684.  Specification of Letters Patent.  Patented Feb. 14, 1922.

Application filed July 17, 1920. Serial No. 397,137.

*To all whom it may concern:*

Be it known that we, ALFRED H. RICHARDS and NORMAN E. RICHARDS, residing at Manville, in the county of Providence and State of Rhode Island, have invented new and useful Improvements in Pistons, of which the following is a specification.

This invention relates to certain new and useful improvements in pistons, and pertains more especially to means for maintaining the piston rings in snug or tight engagement with the inner walls of the cylinder, thereby to guard against leakage of the fluid past the piston, during the movement of the latter.

The primary object of the invention is to provide mechanism of this type which with a positive and certain action yieldably and at all times effects engagement of the piston rings with the cylinder walls.

A further object of the invention is to provide mechanism under the impulse of springs which can be adjusted easily and quickly so as to vary the spring action, making same light or heavy as desired.

The invention still further aims to provide a multiplicity of mechanisms of this type which engage the piston ring at regular spaced intervals throughout the circumference thereof so as to obtain uniform engagement of the rings with the cylinder walls, throughout the circumference of the rings and walls.

The invention also aims to provide a device which is simple and economical in construction and to also provide a novel form of adjustment means for the spring tension.

Still further objects will be later set forth and manifested in the course of the following description.

In the drawings:

Figure 1, is a side elevation of the invention;

Figure 2, is a bottom end elevation;

Figure 3, is a fragmentary section on line 3—3 of Figure 1;

Figure 4, is a section on line 4—4; and

Figure 5 is a section on line 5—5 of Figure 3 showing the adjusting wrench.

In proceeding in accordance with the present invention a piston is formed with the usual grooves in which the piston rings 1 are mounted. These grooves as shown have parallel side walls between which walls and in which grooves elongated heads 2 are mounted for in and out sliding movements. These heads have a segmental shape so that their peripheries will conform to the inner circumference of the piston rings. As depicted in Figure 3 the bottoms of the grooves for the rings 1 are offset at 3 so as to accommodate the heads 2, providing seats for the inner faces of the heads. It will be noted from Figure 1 that the heads 2 are rather long and are supported on each of their sides by the side walls of the grooves, thus providing against rotation of the heads as well as affording substantial support and pressure areas for the inner circumference of the rings.

Each head is formed with a threaded stem 4 which latter have annular nuts 5 turnably mounted on the threads and bearing against the inner faces of the inset walls 6 of the piston. The shanks 4 extend freely through openings 7 provided therefor in the walls 6 so that the heads can freely move in and out. The walls 6 are formed with yokes 8 which are also perforated to receive the shanks 4, the yokes being open on opposite sides for a purpose later to be set forth. Coil springs 9 encircle the stems or shanks 4 bearing at one end against the ends of the yokes and at their opposite ends against the nuts 5, these springs performing in a dual manner, namely to normally urge the heads outwardly and to also hold the nuts seated against the inner faces of the walls 6 thereby to prevent turning of the nuts after adjustment of the spring tension now to be described.

The nuts are formed with teeth 10 for engagement with the teeth 11 of the wrench 12, which latter is in the form of a bar having a handle at one end if desired and as shown. By reference to Figure 5 it will be seen that the sides of the yoke are spaced predeterminately from opposite sides of the nut so that the wrench can be introduced in such spaces and being held engaged with the sides of the yoke will be correspondingly held with its teeth in mesh with the teeth of the nut, so that upon mere sliding of the handle or bar the wrench will effect rotation of the nut. After adjustment the wrench can be turned at right angles so as to cause its teeth to be disengaged from the nut teeth whereupon the wrench can be removed.

It will be apparent that the heads thus bear against the piston ring with such force as to cause them to always be in contact with the walls of the cylinder. The piston is as shown in Figure 1 provided with a double set of pressure devices one set for the top ring and the other for the bottom ring.

It will also be apparent that as many of these devices may be used as may be desired or found necessary.

Having thus described our invention, what we claim as new and desire to secure by Letters Patent is:

1. A piston having ring grooves and rings therein, inset walls at the bottom of the grooves, segmental heads slidable in the grooves and having threaded shanks, yokes open on their sides and extending inwardly from the walls, the yoke ends and the walls having openings to slidably receive the shanks, nuts threaded on the shanks and bearing against the inner faces of the walls, coil springs on the shanks abutting the nuts and said yoke ends, the nuts having teeth on their peripheries spaced from the adjacent sides of the yokes, the yoke sides being formed to engage a wrench to hold the latter with the teeth thereof in mesh with the nut teeth.

2. A piston having ring grooves and rings therein, inset walls at the bottoms of the grooves, segmental heads slidable in the grooves and having threaded shanks, yokes open on their sides and extending inwardly from the walls, the yoke ends and the walls having openings to slidably receive the shanks, nuts threaded on the shanks and bearing against the inner faces of the walls, and coil springs on the shanks abutting the nuts and said yoke ends.

3. In combination with a piston and the rings thereof, a series of heads arranged radially of the piston and formed to engage the inner faces of the rings, springs for tensioning the heads, and nuts carried by the heads and engaged by the springs so as to be held against rotation thereby and for effecting adjustment of the spring tension.

4. In combination with a piston and the rings thereof, heads arranged radially of the piston and having shanks the heads being formed to engage the inner faces of the rings, nuts threaded on the shanks, coil springs abutting the nuts at one end to force the latter against the piston so as to hold same against accidental turning, the springs surrounding the shanks, and means engaging the opposite ends of the springs to prevent movement thereof.

In testimony whereof we have signed our names to this specification in the presence of two subscribing witnesses.

ALFRED H. RICHARDS.
NORMAN E. RICHARDS.

Witnesses:
  E. P. TOOMEY,
  J. A. MILLER.